United States Patent
Dande et al.

(10) Patent No.: US 12,050,505 B2
(45) Date of Patent: *Jul. 30, 2024

(54) SYSTEMS AND METHODS FOR AUTOMATICALLY APPLYING CONFIGURATION CHANGES TO COMPUTING CLUSTERS

(71) Applicant: BANK OF AMERICA CORPORATION, Charlotte, NC (US)

(72) Inventors: Pratap Dande, Saint Johns, FL (US); Vinit Shah, Indian Trail, NC (US); Sarveshwar Kuncha, Frisco, TX (US); Jedidiah Wallace, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,587

(22) Filed: Mar. 13, 2023

(65) Prior Publication Data
US 2023/0236911 A1 Jul. 27, 2023

Related U.S. Application Data

(63) Continuation of application No. 17/585,028, filed on Jan. 26, 2022, now Pat. No. 11,656,926.

(51) Int. Cl.
*G06F 11/00* (2006.01)
*G06F 11/07* (2006.01)
*G06F 11/34* (2006.01)

(52) U.S. Cl.
CPC ...... *G06F 11/0709* (2013.01); *G06F 11/0793* (2013.01); *G06F 11/3476* (2013.01)

(58) Field of Classification Search
CPC ............ G06F 11/0709; G06F 11/0793; G06F 11/3476; G06F 11/3466; G06F 11/142;
(Continued)

(56) References Cited

U.S. PATENT DOCUMENTS 7,236,486 B2 6/2007 Baker et al.
7,823,055 B2 10/2010 Sull et al.
(Continued)

OTHER PUBLICATIONS

Google, Viewing cluster autoscaler events, Oct. 27, 2021, cloud.google.com, 19 pages (Year: 2021).*

*Primary Examiner* — Katherine Lin

(57) ABSTRACT

A system includes a memory and a processor. The processor is configured to access one or more configuration logs generated by a computing cluster. The processor is further configured to determine, by analyzing the one or more configuration logs, a particular service running on the computing cluster that has generated a plurality of errors within the plurality of log messages. The processor is further configured to determine whether the particular error has previously occurred. The processor is further configured to, in response to determining that the particular error has previously occurred, generate and send one or more commands to the computing cluster. The one or more commands are operable to change a current configuration value for the particular service running on the computing cluster to a new configuration value. The new configuration value is based on a historical value stored in the database of historical configuration errors.

17 Claims, 4 Drawing Sheets

(58) Field of Classification Search
CPC ............. G06F 11/1423; G06F 11/2069; G06F 11/3051; G06F 11/3093
See application file for complete search history.

(56) References Cited

U.S. PATENT DOCUMENTS

| | | |
|---|---|---|
| 7,853,600 B2 | 12/2010 | Herz et al. |
| 7,974,714 B2 | 7/2011 | Hoffberg |
| 8,073,839 B2 | 12/2011 | Rathod |
| 8,117,314 B2 | 2/2012 | Croft et al. |
| 8,166,552 B2 | 4/2012 | Prafullchandra et al. |
| 8,169,185 B2 | 5/2012 | Partovi et al. |
| 8,171,032 B2 | 5/2012 | Herz |
| 8,230,343 B2 | 7/2012 | Logan et al. |
| 8,315,150 B2 | 11/2012 | Geile et al. |
| 8,316,113 B2 | 11/2012 | Linden et al. |
| 8,316,237 B1 | 11/2012 | Felsher et al. |
| 8,370,362 B2 | 2/2013 | Szabo |
| 8,429,630 B2 | 4/2013 | Nickolov et al. |
| 8,539,359 B2 | 9/2013 | Rapaport et al. |
| 8,566,115 B2 | 10/2013 | Moore |
| 8,655,307 B1 | 2/2014 | Walker et al. |
| 8,674,943 B2 | 3/2014 | Westerman et al. |
| 8,682,350 B2 | 3/2014 | Altman et al. |
| 8,693,347 B2 | 4/2014 | Elliott et al. |
| 8,764,651 B2 | 7/2014 | Tran |
| 8,855,469 B2 | 10/2014 | Maharajh et al. |
| 8,935,216 B2 | 1/2015 | Allison et al. |
| 9,015,662 B2 | 4/2015 | Oslake et al. |
| 9,117,447 B2 | 8/2015 | Gruber et al. |
| 9,142,071 B2 | 9/2015 | Ricci |
| 9,179,316 B2 | 11/2015 | Raleigh |
| 9,204,796 B2 | 12/2015 | Tran |
| 9,210,141 B2 | 12/2015 | Anderson et al. |
| 9,246,765 B2 | 1/2016 | Panuganty et al. |
| 9,262,231 B2 | 2/2016 | Bretemitz et al. |
| 9,326,012 B1 | 4/2016 | Dorwin |
| 9,396,008 B2 | 7/2016 | Neuse et al. |
| 9,426,030 B1 | 8/2016 | Anerousis et al. |
| 9,515,869 B2 | 12/2016 | Ngo |
| 9,716,624 B2 | 7/2017 | Zeyliger et al. |
| 9,807,116 B2 | 10/2017 | Frascadore et al. |
| 9,848,041 B2 | 12/2017 | Einkauf et al. |
| 10,084,723 B2 | 9/2018 | Mordani et al. |
| 10,320,891 B2 | 6/2019 | Agarwal et al. |
| 10,334,050 B2 | 6/2019 | Kentley-Klay et al. |
| 10,419,450 B2 | 9/2019 | Muddu et al. |
| 10,523,709 B2 | 12/2019 | Bower |
| 10,594,547 B2 | 3/2020 | Johnsen et al. |
| 10,678,585 B2 | 6/2020 | Zada et al. |
| 10,701,078 B2 | 6/2020 | Chambers et al. |
| 10,756,995 B2 | 8/2020 | Schibler et al. |
| 10,872,333 B2 | 12/2020 | Dua |
| 10,908,837 B2 | 2/2021 | Fetik |

* cited by examiner

```
2021-04-30 18:21:33, 520 INFO org.apache.hadoop.lib.server.Server: Server [httpfs] starting
2021-04-30 18:21:33, 520 INFO org.apache.hadoop.lib.server.Server: Built information:
2021-04-30 18:21:33, 520 INFO org.apache.hadoop.lib.server.Server:   Version            : 3.1.1
2021-04-30 18:21:33, 520 INFO org.apache.hadoop.lib.server.Server:   Source Repositoy  : REPO NOT AVAIL
2021-04-30 18:21:33, 520 INFO org.apache.hadoop.lib.server.Server:   Source Revision   : REVISION NOT AVAIL
2021-04-30 18:21:33, 520 INFO org.apache.hadoop.lib.server.Server:   Built by          : USER A
2021-04-30 18:21:33, 520 INFO org.apache.hadoop.lib.server.Server:   Built timestamp   : 2021-03-09T11:54:01+0000
2021-04-30 18:21:33, 520 INFO org.apache.hadoop.lib.server.Server: Runtime information :
2021-04-30 18:21:33, 521 INFO org.apache.hadoop.lib.server.Server:   Home   dir: /lib/hadoop-httpfs
2021-04-30 18:21:33, 521 INFO org.apache.hadoop.lib.server.Server:   Config dir: /var/run/process/hdfs-HTTPFS/run/
2021-04-30 18:21:33, 521 INFO org.apache.hadoop.lib.server.Server:   Log    dir: /data/logs/hadoop-httpfs
2021-04-30 18:21:33, 521 INFO org.apache.hadoop.lib.server.Server:   Temp   dir: /var/run/process/hdfs-HTTPFS/run/
2021-04-30 18:21:33, 539 INFO org.apache.hadoop.lib.server.Server: System property sets  httpfs.config.dir: /var/run/process/hdfs-HTTPFS
2021-04-30 18:21:33, 539 INFO org.apache.hadoop.lib.server.Server: System property sets  httpfs.log.dir: /data/logs/hadoop-httpfs
2021-04-30 18:21:33, 539 INFO org.apache.hadoop.lib.server.Server: System property sets  httpfs.temp.dir: /var/run/process/hdfs-HTTPFS/run/
2021-04-30 18:21:33, 539 INFO org.apache.hadoop.lib.server.Server: System property sets  httpfs.home.dir: /lib/hadoop-httpfs
2021-04-30 18:21:33, 548 INFO org.apache.hadoop.lib.service.hadoop.FileSystemAccessService: Using FileSystemAccess JARs version [3.1.1]
2021-04-30 18:21:33, 734 INFO org.apache.hadoop.lib.server.Server: Services initialized
2021-04-30 18:21:33, 734 INFO org.apache.hadoop.lib.server.Server: Server [httpfs] started!, status [NORMAL]
2021-04-30 18:21:33, 758 INFO org.apache.hadoop.fs.http.server.HttpFSServerWebApp: Connects to Namenode [hdfs://clusternameservice]
2021-04-30 18:21:33, 759 INFO org.apache.hadoop.security.token.delegation.AbstractDelegationTokenSecretManager: Starting expired delegation token remover thread,
                                                                                                              tokenRemoverScanInterval=60 min(s)
2021-04-30 18:21:33, 760 INFO org.apache.hadoop.security.token.delegation.AbstractDelegationTokenSecretManager: Updating the current master key for generating
                                                                                                              delegation tokens
2021-04-30 19:03:45, 132 ERROR org.apache.hadoop.fs.http.server.HttpFSServerWebServer: RECEIVED SIGNAL 15: SIGTERM
2021-04-30 19:03:45, 134 INFO  org.apache.hadoop.fs.http.server.HttpFSServerWebServer: SHUTDOWN_MSG: Shutting down HttpFSServerWebServer
```

210 brackets the first three lines; 131 labels the block.

| Date | Time | Service 132 | Log Class 220 | Clean Log 230 |
|---|---|---|---|---|
| 2021-08-10 | 00:27:41, 021 | Kafka | org.10ltec.zxclient.exception.ZkTimeoutException | unable connect zookeeper server within timeout |
| 2021-08-10 | 00:28:14, 021 | Kafka | org.10ltec.zxclient.exception.ZkTimeoutException | unable connect zookeeper server within timeout |
| 2021-08-10 | 00:28:31, 021 | Kafka | org.10ltec.zxclient.exception.ZkTimeoutException | unable connect zookeeper server within timeout |

| Date | Time | Service 132 | Description | Property file | Property key 240 | Before change value 250A | After change value 250B |
|---|---|---|---|---|---|---|---|
| 2021-08-10 | 00:25:41, 021 | Kafka | Timeout in ms for connecting to the zookeeper | server.properties | zookeeper.connection.timeout.ms | 18000 | 600 |
| 2021-08-10 | 00:26:20, 271 | Kafka | Zookeeper connection string | server.properties | zookeeper.connect | localhost:2181 | localhost:2120 |
| 2021-08-10 | 00:25:40, 341 | Kafka | Number of partitions per topic | server.properties | num.partitions | 1 | 1 |

*FIG. 2C*

SYSTEMS AND METHODS FOR AUTOMATICALLY APPLYING CONFIGURATION CHANGES TO COMPUTING CLUSTERS

CROSS-REFERENCE TO RELATED APPLICATION

The application is a continuation of U.S. patent application Ser. No. 17/585,028, filed Jan. 26, 2022, by Pratap Dande, and entitled "SYSTEMS AND METHODS FOR AUTOMATICALLY APPLYING CONFIGURATION CHANGES TO COMPUTING CLUSTERS," which is incorporated herein by reference.

TECHNICAL FIELD

The present disclosure relates generally to computing clusters, and more specifically to systems and methods for automatically applying configuration changes to computing clusters.

BACKGROUND

Computing clusters are utilized by many organizations to support and enable the various applications utilized by the organization. For example, a large organization may utilize dozens or even hundreds of Hadoop computing clusters in order to provide the services that enable a mobile application of the organization. Computing clusters utilize many different cluster configurations (e.g., system-level configurations and service-level configurations) to configure how the various services provided by the computing clusters are executed. In many environments, configurations of computing clusters are frequently changed to address problems such as performance and security issues. However, tracking configuration changes—an important task for engineers to understand the effects of configuration changes—may be difficult or impossible due to the frequency and number of configuration changes that are typical of larger computing cluster installations.

SUMMARY

Computing clusters are utilized by many organizations to support and enable the various applications utilized by the organization. For example, a large organization may utilize dozens or even hundreds of Hadoop computing clusters in order to provide the services that enable a mobile application of the organization. Computing clusters utilize many different cluster configurations (e.g., system-level configurations and service-level configurations) to configure how the various services provided by the computing clusters are executed. In many environments, configurations of computing clusters are frequently changed to address problems such as performance and security issues. However, tracking configuration changes—an important task for engineers to understand the effects of configuration changes—may be difficult or impossible due to the frequency and number of configuration changes that are typical of larger computing cluster installations. Furthermore, configuration changes may at times result in errors within a computing cluster, thereby causing performance and execution issues.

To address these and other problems with existing cluster computing systems, this disclosure contemplates systems and methods that periodically and automatically analyze configuration logs of computing clusters in order to identify, display, and correct configuration errors (i.e., automatically send instructions to a computing cluster to change configuration values in order to correct identified configuration errors). To do so, the disclosed embodiments periodically retrieve configuration logs of a computing cluster and perform various analysis techniques on the configuration logs (e.g., clustering techniques accompanied with Natural Language Processing (NLP)) in order to uncover patterns from the data and to discover configuration changes and errors. Once a configuration error is discovered, the disclosed embodiments then present the errors for display on a computing device and generate one or more instructions to send to the computing cluster in order to correct the configuration errors. For example, the disclosed embodiments may consult a database of historical configuration errors in order to determine a correct configuration value to send to the computing cluster. As a result, cluster configuration errors may be automatically identified and corrected, thereby reducing downtime and wastage of overall system resources that is typical of misconfigured computing clusters.

In one embodiment, a system includes a memory and a processor. The processor is configured to access one or more configuration logs generated by a computing cluster. Each configuration log comprises a plurality of log messages associated with a plurality of services running on the computing cluster. The processor is further configured to determine, by analyzing the one or more configuration logs, a particular service running on the computing cluster that has generated a plurality of errors within the plurality of log messages. The processor is further configured to determine, by comparing a particular error of the plurality of errors generated by the particular service to a plurality of historical configuration errors in a database of historical configuration errors, whether the particular error has previously occurred. The processor is further configured to, in response to determining that the particular error has previously occurred, generate and send one or more commands to the computing cluster. The one or more commands are operable to change a current configuration value for the particular service running on the computing cluster to a new configuration value. The new configuration value is based on a historical value stored in the database of historical configuration errors.

A practical application of the systems and methods described herein is that cluster configuration errors may be automatically identified and corrected. By automatically identifying and correcting configuration errors of a computing cluster, an organization's computing systems may operate more efficiently. For example, an organization's mobile applications may operate more efficiently and correctly than with misconfigured computing clusters. Another practical application is that configuration errors and changes may be automatically identified and displayed in real-time. This may allow technicians to quickly identify and correct any incorrect cluster configurations, thereby improving the performance of applications and computer systems.

Embodiments of the present disclosure provide technological solutions to technological problems. For example, the disclosed embodiments may automatically correct misconfigured computing clusters without any interaction from personnel. As a specific example, embodiments may automatically analyze cluster configurations from multiple computing clusters in order to identify configuration errors. Once an error in a cluster configuration is identified, embodiments may send one or more instructions to a computing cluster in order to correct the error in the cluster configuration. As a result, an organization's computing clusters may have correct or optimal configurations, thereby reducing or eliminating wastage of computing resources (e.g., computing power, memory, etc.) that is typically associated with computing clusters that have incorrect or suboptimal configurations (e.g., configurations that cause errors in configuration logs). Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2A illustrates an example configuration log that may be analyzed by the system of FIG. 1, according to certain embodiments;

FIG. 2B illustrates example results of performing LSA on a configuration log, according to certain embodiments;

FIG. 2C illustrates an example configuration change graphical user interface that may be displayed by the system of FIG. 1, according to certain embodiments.

DETAILED DESCRIPTION

Computing clusters are utilized by many organizations to support and enable the various applications utilized by the organization. For example, a large organization may utilize dozens or even hundreds of Hadoop computing clusters in order to provide the services that enable a mobile application of the organization. Computing clusters utilize many different cluster configurations (e.g., system-level configurations and service-level configurations) to configure how the various services provided by the computing clusters are executed. In many environments, configurations of computing clusters are frequently changed to address problems such as performance and security issues. However, tracking configuration changes—an important task for engineers to understand the effects of configuration changes—may be difficult or impossible due to the frequency and number of configuration changes that are typical of larger computing cluster installations. Furthermore, configuration changes may at times result in errors within a computing cluster, thereby causing performance and execution issues.

To address these and other problems with existing cluster computing systems, this disclosure contemplates systems and methods that periodically and automatically analyze configuration logs of computing clusters in order to identify, display, and correct configuration errors (i.e., automatically send instructions to a computing cluster to change configuration values in order to correct identified configuration errors). To do so, the disclosed embodiments periodically retrieve configuration logs of a computing cluster and perform various analysis techniques on the configuration logs (e.g., clustering techniques accompanied with Natural Language Processing (NLP)) in order to uncover patterns from the data and to discover configuration changes and errors. Once a configuration error is discovered, the disclosed embodiments then present the errors for display on a computing device and generate one or more instructions to send to the computing cluster in order to correct the configuration errors. For example, the disclosed embodiments may consult a database of historical configuration errors in order to determine a correct configuration value to send to the computing cluster. As a result, cluster configuration errors may be automatically identified and corrected, thereby reducing downtime and wastage of overall system resources that is typical of misconfigured computing clusters.

Figure 1:
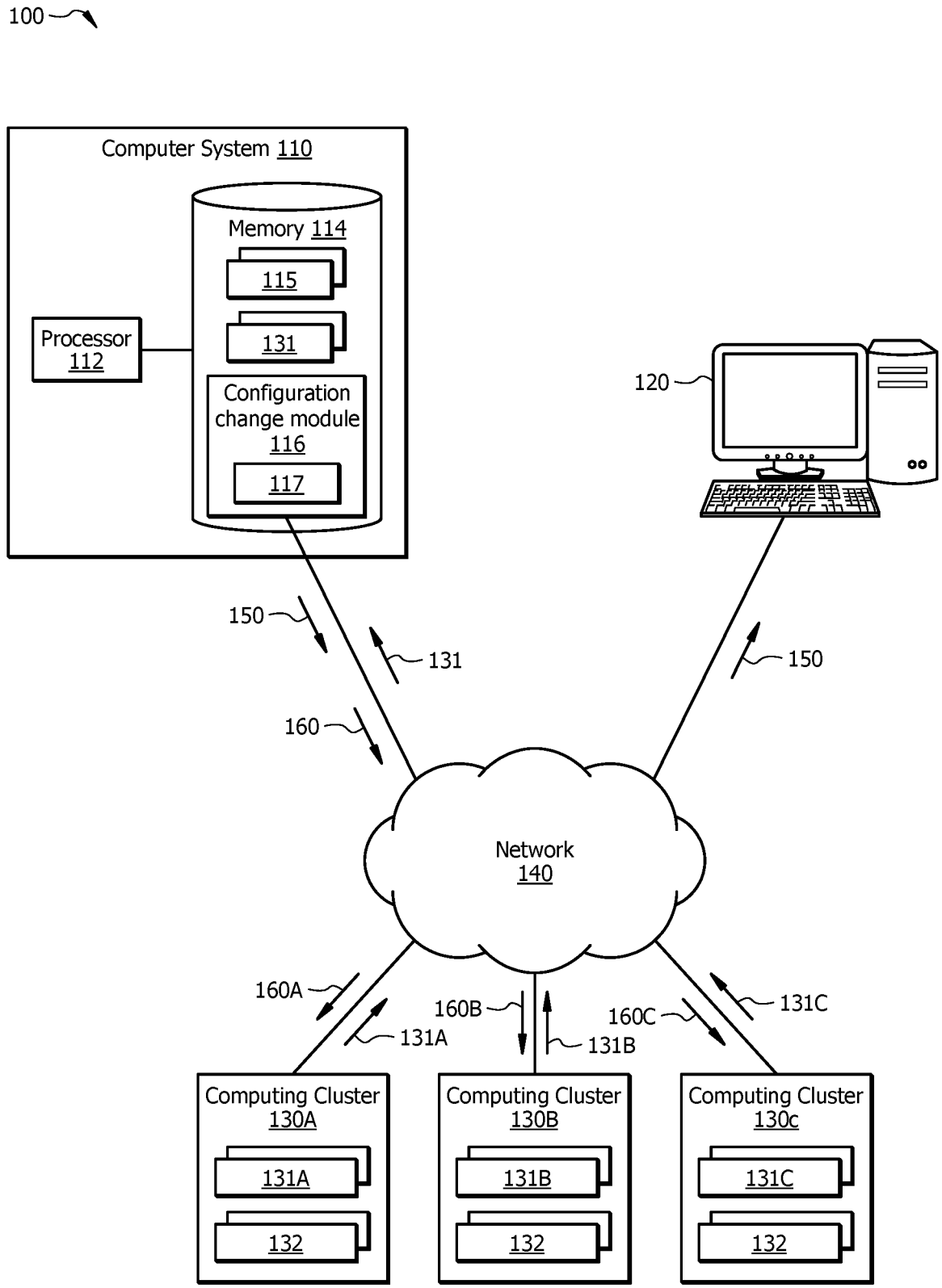
FIG. 1 is a schematic diagram of an example system for automatically applying configuration changes to computing clusters, according to certain embodiments.
Figure 3:
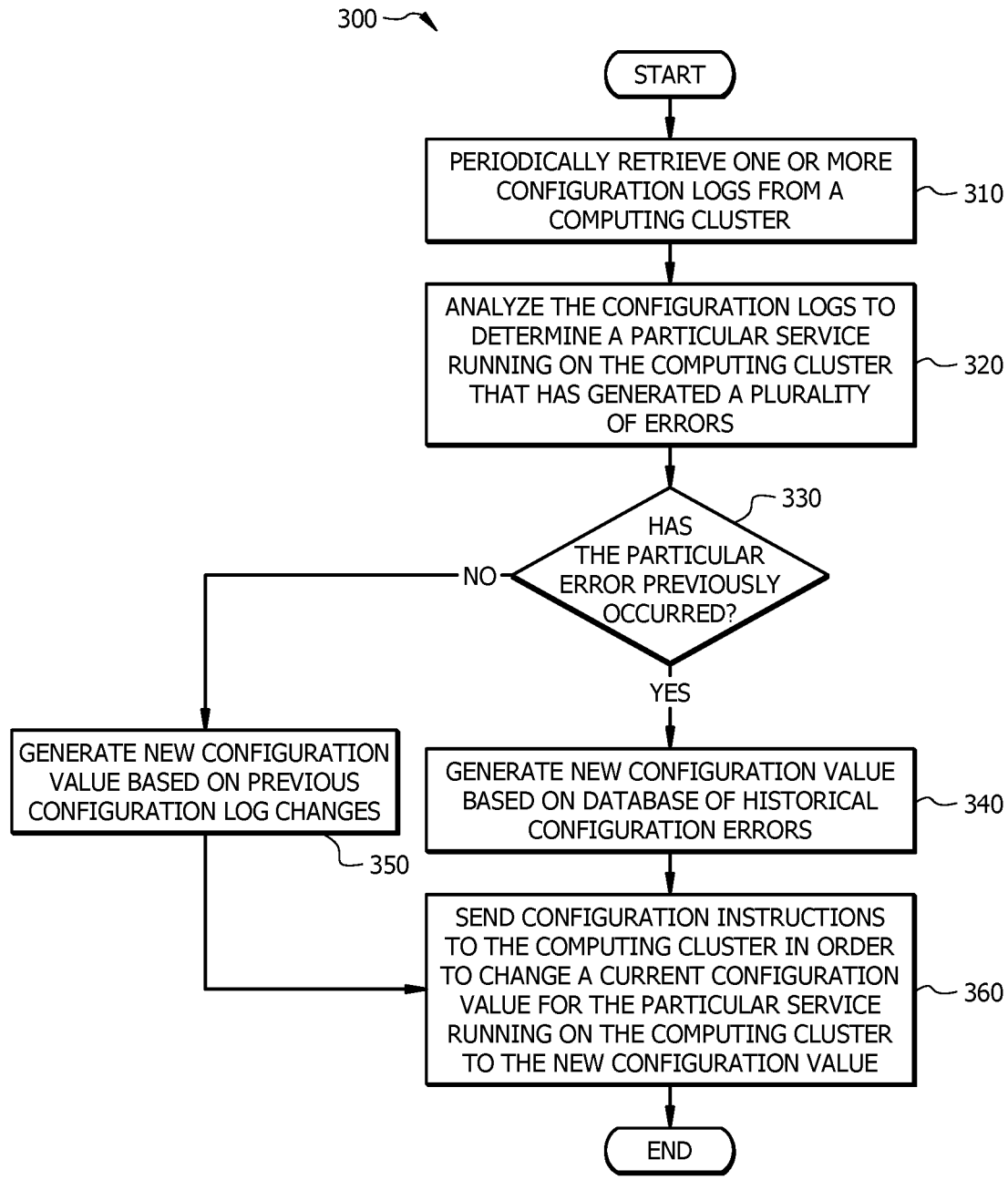
FIG. 3 is a flowchart of a method for automatically applying configuration changes to computing clusters, according to certain embodiments.

FIGS. 1 through 3 show example systems and methods for automatically applying configuration changes to computing clusters in order to correct configuration errors identified in configuration logs. FIG. 1 illustrates an example system for automatically applying configuration changes to computing clusters. FIG. 2A illustrates an example configuration log that may be analyzed by the system of FIG. 1. FIG. 2B illustrates example results of performing LSA on a configuration log. FIG. 2C illustrates an example configuration change graphical user interface that may be displayed by the system of FIG. 1. FIG. 3 illustrates an example method for automatically applying configuration changes to computing clusters.

FIG. 1 illustrates an example configuration change system 100 that automatically applies configuration changes to computing clusters in order to correct configuration errors identified in configuration logs, according to certain embodiments. Configuration change system 100 includes a computer system 110, a user device 120, multiple computing clusters 130 (e.g., 130A-130C), and a network 140. Computer system 110 is communicatively coupled to user device 120 and computing clusters 130 via network 140 using any appropriate wired or wireless telecommunication technology.

In general, computer system 110 of configuration change system 100 analyzes configuration logs 131 from computing clusters 130 in order to display configuration changes (e.g., in configuration change graphical user interface 150 displayed on user device 120 or computer system 110) and to automatically apply configuration changes to computing clusters 130 in order to correct configuration errors identified in configuration logs 131. To do so, certain embodiments of computer system 110 periodically retrieve one or more configuration logs 131 from a computing cluster 130 and then determine, by analyzing the one or more configuration logs 131, a particular service 132 running on the computing cluster 130 that has generated a plurality of errors within log messages of the one or more configuration logs 131. Computer system 110 may then determine, by comparing a particular error generated by the particular service 132 to a plurality of historical configuration errors in database of historical configuration errors 115, whether the particular error has previously occurred. If computer system 110 determines that the particular error has previously occurred, computer system 110 may generate and send configuration instructions 160 to the computing cluster 130. The configuration instructions 160 are operable to change a current configuration value for the particular service 132 running on the computing cluster 130 to a new configuration value. As a result, configurations of computing clusters 130 may be automatically corrected based on errors in configuration logs 131, thereby reducing wastage of overall system resources that is typical of misconfigured computing clusters.

Computer system 110 may be any appropriate computing system in any suitable physical form. As example and not by way of limitation, computer system 110 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computer system 110 may include one or more computer systems 110; be unitary or distributed; span multiple locations; span multiple machines; span multiple data centers; or reside in a cloud, which may include one or more cloud components in one or more networks. Where appropriate, one or more computer systems 110 may perform without substantial spatial or temporal limitation one or more steps of one or more methods described or illustrated herein. As an example and not by way of limitation, one or more computer systems 110 may perform in real time or in batch mode one or more steps of one or more methods described or illustrated herein. One or more computer systems 110 may perform at different times or at different locations one or more steps of one or more methods described or illustrated herein, where appropriate.

Processor 112 is any electronic circuitry, including, but not limited to a microprocessor, an application specific integrated circuits (ASIC), an application specific instruction set processor (ASIP), and/or a state machine, that communicatively couples to memory 114 and controls the operation of computing system 110. Processor 112 may be 8-bit, 16-bit, 32-bit, 64-bit or of any other suitable architecture. Processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 112 may include other hardware that operates software to control and process information. Processor 112 executes software stored in memory to perform any of the functions described herein. Processor 112 controls the operation and administration of computer system 110 by processing information received from computing clusters 130 and memory 114. Processor 112 may be a programmable logic device, a microcontroller, a microprocessor, any suitable processing device, or any suitable combination of the preceding. Processor 112 is not limited to a single processing device and may encompass multiple processing devices.

Memory 114 may store, either permanently or temporarily, operational software such as configuration change module 116, or other information for processor 112 as illustrated. Memory 114 may include any one or a combination of volatile or non-volatile local or remote devices suitable for storing information. For example, memory 114 may include random access memory (RAM), read only memory (ROM), magnetic storage devices, optical storage devices, or any other suitable information storage device or a combination of these devices.

Database of historical configuration errors 115 is a database that is utilized by computer system 110 in order to determine whether an error within configuration log 131 has previously occurred. Database of historical configuration errors 115 may be stored in any appropriate memory such as memory 114. In some embodiments, database of historical configuration errors 115 includes historical configuration errors (e.g., error messages), a service 132 associated with each historical configuration error, and historical values (i.e., configuration values) associated with each historical configuration error. As described in more detail below, the historical values stored in database of historical configuration errors 115 may be used by certain embodiments for configuration instructions 160.

Configuration change module 116 represents any suitable set of instructions, logic, or code embodied in a computer-readable storage medium. For example, configuration change module 116 may be embodied in memory 114, a disk, a CD, or a flash drive. In particular embodiments, configuration change module 116 may include instructions 117 (e.g., a software application) executable by processor 112 to perform one or more of the functions described herein. In general, configuration change module 116 sends configuration instructions 160 to computing clusters 130 via network 140. In addition, configuration change module 116 sends instructions to display configuration change graphical user interface 150 on an electronic display (e.g., on user device 120 or computer system 110).

User device 120 is any appropriate device for communicating with components of computer system 110 over network 140. For example, user device 120 may be a handheld computing device such as a smartphone, wearable computer glasses, a smartwatch, a tablet computer, a laptop computer, a desktop computer, and the like. User device 120 may include an electronic display, a processor such processor 112, and memory such as memory 114. The electronic display of user device 120 may display cluster configuration comparison 150 and cluster configuration history 160 that is provided by computer system 110.

Each computing cluster 130 is a collection of computers (i.e., nodes) that are networked together to perform parallel computations on big data sets. Computing clusters 130 are configured to store and analyze large amounts of structured and unstructured data in a distributed computing environment. In some embodiments, each computing clusters 130 is a Hadoop cluster.

Each computing cluster 130 utilizes various cluster configurations for configuring and controlling services 132 running on computing clusters 130. Services 132 may include, for example, HDFS, Hive, HBase, and the like. During operation, each computing cluster 130 generates one or more configuration logs 131 (e.g., 131A-C) in order to record events and errors associated with services 132. An example raw configuration log 131 is illustrated in FIG. 2A. Each configuration log 131 may include log messages 210 associated with services 132 running on the computing cluster 130.

Network 140 allows communication between and amongst the various components of configuration change system 100. For example, computing system 110, user device 120, and computing clusters 130 may communicate via network 140. This disclosure contemplates network 140 being any suitable network operable to facilitate communication between the components of configuration change system 100. Network 140 may include any interconnecting system capable of transmitting audio, video, signals, data, messages, or any combination of the preceding. Network 140 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network.

Configuration change graphical user interface 150 is an interface displayed by computer system 110 on either computer system 110 or user device 120. Configuration change graphical user interface 150 displays information regarding configuration logs 131. In some embodiments, configuration change graphical user interface 150 displays insights into changes in configuration logs 131. For example, if a particular configuration value for a particular service 132 has changed multiple times, configuration change graphical user interface 150 may display the different configuration values in order to give a user insights into the changes. A particular example of configuration change graphical user interface 150 is illustrated in FIG. 2C. In this example, configuration change graphical user interface 150 includes configuration keys 240 and historical configuration values 250 (e.g., 250A and 250B). Each configuration key 240 is associated with a particular service 132. Each historical configuration value 250 is a value of the corresponding configuration key 240. For example, historical configuration value 250A is the value of configuration key 240 of "zookeeper.connection.timout.ms" for service 132 of "Kafka" before a change was implemented. Likewise, historical configuration value 250B is the value of configuration key 240 of "zookeeper.connection.timeout.ms" for service 132 of "Kafka" after a change was implemented.

Configuration instructions 160 are one or more computer instructions sent from computer system 110 to one or more computing clusters 130. In general, configuration instructions 160 are operable to change a current configuration value for a particular service 132 running on a computing cluster 130 to a new configuration value. In some embodiments, the new configuration value is based on a historical value stored in database of historical configuration errors 115, as discussed in more detail below. As a specific example, configuration instructions 160 may be PUT/GET commands for a Hadoop computing cluster 130.

In operation, computer system 110 of configuration change system 100 analyzes configuration logs 131 from computing clusters 130 in order to display configuration changes (e.g., configuration change graphical user interface 150) and to automatically apply configuration changes to computing clusters 130 in order to correct configuration errors identified in configuration logs 131. To do so, certain embodiments of computer system 110 periodically retrieve or otherwise access one or more configuration logs 131 generated by a computing cluster 130. For example, computer system 110 may retrieve configuration logs 131A from computing cluster 130A every minute, hour, day, etc. Computer system 110 may then determine, by analyzing the one or more configuration logs 131, a particular service 132 running on the computing cluster 130 that has generated a plurality of errors within log messages of the one or more configuration logs 131. To determine the particular service 132 running on the computing cluster 130 that has generated errors within configuration logs 131, certain embodiments may utilize natural language processing. For example, some embodiments may first process the raw configuration log 131 from a computing cluster 130 in order to generate a preprocessed log file. The preprocessed log file may be generated by some embodiments by normalizing log messages within the configuration log 131. For example, embodiments may normalize the log messages by lowercasing the log messages, by removing special characters from the log messages, by removing stop words from the plurality of log messages, by applying lemmatization, and the like.

Once the preprocessed log file is generated, computer system 110 may then generate a filtered log file by filtering the preprocessed log file for specific events related to service 132. For example, computer system 110 may filter the preprocessed log file to only include log messages associated with a service start, a service shutdown, or a service restart. After generating the filtered log file, computer system 110 may utilize Latent Symantec Analysis (LSA) on the filtered log file to determine the particular service 132 running on the computing cluster 130 that has generated errors in configuration log 131. For example, LSA may be used to group errors within the filtered log file together and therefore identify a particular service that that has repeatedly caused the same or similar error. For example, FIG. 2B illustrates the results of performing LSA on a filtered log file. In this illustrated example of FIG. 2B, the results of performing LSA indicate that a particular service 132 of "Kafka" has generated identical log classes 220 of "org.101tec.zkclient.exception.ZkTimeoutException" with log messages 230 of "unable connect zookeeper server within timeout." As a result, computer system 110 may determine that the particular service 132 of "Kafka" has generated errors within log messages of configuration log 131.

After determining a particular service 132 that has generated errors within log messages of configuration log 131, computer system 110 may determine whether a particular error generated by the particular service 132 has previously occurred. To do so, some embodiments may compare a particular error generated by the particular service 132 to a plurality of historical configuration errors within database of historical configuration errors 115. Continuing the example of FIG. 2B, computer system 110 may analyze database of historical configuration errors 115 in order to determine whether a particular service 132 of "Kafka" has previously generated log messages 230 of "unable connect zookeeper server within timeout" for a log class 220 of "org.101tec.zkclient.exception.ZkTimeoutException." If computer system 110 determines from database of historical configuration errors 115 that the particular error has previously occurred, computer system 110 may determine a new configuration value from database of historical configuration errors 115 to send to computing cluster 130 to correct the error. The new configuration value may be sent via configuration instructions 160 to computing cluster 130 and may replace a current configuration value that is causing the error within computing clusters 130. For example, database of historical configuration errors 115 may indicate that for the particular service 132 of "Kafka" and a log message 230 of "unable connect zookeeper server within timeout," a configuration key 240 of "zookeeper.connection.timeout.ms" should have a value of "18000" in order to avoid errors. Thus, the value of "18000" for "zookeeper.connection.timeout.ms" and service 132 of "Kafka" may be sent to computing cluster 130 via configuration instructions 160. As a result, configurations of computing clusters 130 may be automatically corrected based on errors in configuration logs 131, thereby reducing wastage of overall system resources that is typical of misconfigured computing clusters.

In some embodiments, computer system 110 may display configuration changes found within configuration logs 131 via configuration change graphical user interface 150. In these embodiments, computer system 110 may first retrieve additional configuration data from computing cluster 130 about the particular service 132 running on the computing cluster that is causing errors in configuration log 131. In some embodiments, the additional configuration data may include configuration keys 240 and historical configuration values 250 as illustrated in FIG. 2C. For example, the configuration data received by computer system 110 may include a historical configuration value 250A of "18000" for configuration key 240 of "zookeeper.connection.timout.ms" before a change was implemented, and a historical configuration value 250B of "600" after a change was implemented. By graphically displaying changes in configuration values (e.g., historical configuration values 250A and 250B), a user may be able to quickly and easily see configuration changes that are causing errors in configuration logs 131.

FIG. 3 illustrates an example method 300 for automatically applying configuration changes to computing clusters, according to certain embodiments. At operation 310, method 300 retrieves one or more configuration logs from a computing cluster. In some embodiments, each configuration log includes log messages associated with services running on the computing cluster. In some embodiments, the configuration logs are configuration logs 131. In some embodiments, the computing cluster is computing cluster 130 and the services running on the computing cluster are services 132.

At operation 320, method 300 determines, by analyzing the one or more configuration logs of operation 310, a particular service running on the computing cluster that has generated a plurality of errors within the plurality of log messages. In some embodiments, operation 320 includes generating a preprocessed log file by normalizing the plurality of log messages of the one or more configuration logs and then generating a filtered log file by filtering the preprocessed log file. In some embodiments, normalizing the plurality of log messages includes one or more of lowercasing the plurality of log messages, removing special characters from the plurality of log messages, removing stop words from the plurality of log messages, and applying lemmatization. In some embodiments, the filtered log file includes one or more log messages associated with a service start, one or more log messages associated with a service shutdown, and one or more log messages associated with a service restart. In some embodiments, operation 320 additionally includes utilizing Latent Symantec Analysis on the filtered log file to determine the particular service running on the computing cluster that has generated the plurality of errors.

At operation 330, method 300 determines whether a particular error of operation 320 has previously occurred. In some embodiments, operation 330 includes comparing a particular error of the plurality of errors generated by the particular service to a plurality of historical configuration errors in a database of historical configuration errors. In some embodiments, the database of historical configuration errors is database of historical configuration errors 115 and includes the plurality of historical configuration errors, a service associated with each historical configuration error, and a plurality of historical values associated with each historical configuration error. If method 300 determines in operation 330 that a particular error of operation 320 has previously occurred, method 300 proceeds to operation 340. However, if method 300 determines in operation 330 that a particular error of operation 320 has not previously occurred, method 300 proceeds to operation 350.

At operation 340, method 300 generates a new configuration value for the particular service determined in operation 320 based on the database of historical configuration errors of operation 330. In some embodiments, operation 340 includes analyzing the database of historical configuration errors in order to match service names (e.g., "Kafka"), log messages (e.g., "unable connect zookeeper server within timeout") and log classes (e.g., "org.101tec.zkclient.exception.ZkTimeoutException") of entries in the database with the particular service determined in operation 320. Once a match is found in an entry of the database of historical configuration errors, a configuration value of the database entry may be used as the new configuration value.

At operation 350, method 300 generates a new configuration value for the particular service determined in operation 320 based on previous configuration log changes. For example, as illustrated in FIG. 2C, a particular configuration key of "zookeeper.connection.timeout.ms" for service 132 of "Kafka" has a historical configuration value 250A of "18000" before a change was implemented and a historical configuration value 250B of "600" after a change was implemented. Computer system 110 may analyze historical configuration values 250A-B and determine that the new configuration value should be "600" (i.e., change the value back to the original value before the change that cause the error).

At operation 360, method 300 sends configuration instructions to the computing cluster of operation 310 in order to change a current configuration value for the particular service running on the computing cluster to the new configuration value of operations 340 or 350. In some embodiments, the configuration instructions are configuration instructions 160. After operation 360, method 300 may end.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

The invention claimed is:

1. A system comprising:
a computing cluster comprising a plurality of computing nodes configured to perform parallel computations;
a memory configured to store a database of historical configuration errors; and
a processor communicatively coupled to the memory, the processor configured to:
periodically retrieve one or more configuration logs from the computing cluster, each configuration log comprising a plurality of log messages associated with a plurality of services running on the computing cluster;
determine, by analyzing the one or more configuration logs, a particular service running on the computing cluster that has generated a plurality of errors within the plurality of log messages;
determine, by comparing a particular error of the plurality of errors generated by the particular service to a plurality of historical configuration errors in the database of historical configuration errors, whether the particular error has previously occurred; and
in response to determining that the particular error has previously occurred, generate and send one or more commands to the computing cluster, the one or more commands operable to change a current configuration value for the particular service running on the computing cluster to a new configuration value, wherein the new configuration value is based on a historical value stored in the database of historical configuration errors;
wherein analyzing the one or more configuration logs to determine the particular service running on the computing cluster that has generated the plurality of errors comprises:
generating a preprocessed log file by normalizing the plurality of log messages of the one or more configuration logs;
generating a filtered log file by filtering the preprocessed log file, wherein the filtered log file comprises:
one or more log messages associated with a service start;
one or more log messages associated with a service shutdown; and
one or more log messages associated with a service restart; and
utilizing Latent Symantec Analysis on the filtered log file to determine the particular service running on the computing cluster that has generated the plurality of errors.

2. The system of claim 1, the processor further configured to:
retrieve configuration data from the computing cluster about the particular service running on the computing cluster, the configuration data comprising:
a plurality of configuration keys; and
a plurality of historical configuration values, wherein each historical configuration value is associated with one of the plurality of configuration keys; and
display a configuration change graphical user interface on an electronic display, the configuration change graphical user interface comprising the plurality of configuration keys and the plurality of historical configuration values.

3. The system of claim 1, wherein the computing cluster is a Hadoop computing clusters.

4. The system of claim 1, wherein normalizing the plurality of log messages comprises one or more of:
lowercasing the plurality of log messages;
removing special characters from the plurality of log messages;
removing stop words from the plurality of log messages; and
applying lemmatization.

5. The system of claim 1, the processor further configured to:
in response to determining that the particular error has not previously occurred, generate and send one or more other commands to the computing cluster, the one or more other commands operable to change the current configuration value for the particular service running on the computing cluster to a previous configuration value for the particular service running on the computing cluster.

6. The system of claim 1, wherein the database of historical configuration errors comprises:
the plurality of historical configuration errors;
a service associated with each historical configuration error; and
a plurality of historical values associated with each historical configuration error.

7. A method by one or more computer systems, the method comprising:
periodically retrieving one or more configuration logs from a computing cluster, wherein each configuration log comprises a plurality of log messages associated with a plurality of services running on the computing cluster;
determining, by analyzing the one or more configuration logs, a particular service running on the computing cluster that has generated a plurality of errors within the plurality of log messages;
determining, by comparing a particular error of the plurality of errors generated by the particular service to a plurality of historical configuration errors in the database of historical configuration errors, whether the particular error has previously occurred; and
in response to determining that the particular error has previously occurred, generating and sending one or more commands to the computing cluster, the one or more commands operable to change a current configuration value for the particular service running on the computing cluster to a new configuration value, wherein the new configuration value is based on a historical value stored in the database of historical configuration errors;
wherein analyzing the one or more configuration logs to determine the particular service running on the computing cluster that has generated the plurality of errors comprises:
generating a preprocessed log file by normalizing the plurality of log messages of the one or more configuration logs;

generating a filtered log file by filtering the preprocessed log file, wherein the filtered log file comprises:
  one or more log messages associated with a service start;
  one or more log messages associated with a service shutdown; and
  one or more log messages associated with a service restart; and
utilizing Latent Symantec Analysis on the filtered log file to determine the particular service running on the computing cluster that has generated the plurality of errors.

8. The method of claim 7, further comprising:
retrieving configuration data from the computing cluster about the particular service running on the computing cluster, the configuration data comprising:
  a plurality of configuration keys; and
  a plurality of historical configuration values, wherein each historical configuration value is associated with one of the plurality of configuration keys; and
displaying a configuration change graphical user interface on an electronic display, the configuration change graphical user interface comprising the plurality of configuration keys and the plurality of historical configuration values.

9. The method of claim 7, wherein the computing cluster is a Hadoop computing clusters.

10. The method of claim 7, wherein normalizing the plurality of log messages comprises one or more of:
  lowercasing the plurality of log messages;
  removing special characters from the plurality of log messages;
  removing stop words from the plurality of log messages; and
  applying lemmatization.

11. The method of claim 7, further comprising:
in response to determining that the particular error has not previously occurred, generating and sending one or more other commands to the computing cluster, the one or more other commands operable to change the current configuration value for the particular service running on the computing cluster to a previous configuration value for the particular service running on the computing cluster.

12. The method of claim 7, wherein the database of historical configuration errors comprises:
  the plurality of historical configuration errors;
  a service associated with each historical configuration error; and
  a plurality of historical values associated with each historical configuration error.

13. A system comprising:
a memory configured to store a database of historical configuration errors; and
a processor communicatively coupled to the memory, the processor configured to:
  access one or more configuration logs generated by a computing cluster, each configuration log comprising a plurality of log messages associated with a plurality of services running on the computing cluster;
  determine, by analyzing the one or more configuration logs, a particular service running on the computing cluster that has generated a plurality of errors within the plurality of log messages;
  determine, by comparing a particular error of the plurality of errors generated by the particular service to a plurality of historical configuration errors in the database of historical configuration errors, whether the particular error has previously occurred; and
  in response to determining that the particular error has previously occurred, generate and send one or more commands to the computing cluster, the one or more commands operable to change a current configuration value for the particular service running on the computing cluster to a new configuration value, wherein the new configuration value is based on a historical value stored in the database of historical configuration errors;
  wherein analyzing the one or more configuration logs to determine the particular service running on the computing cluster that has generated the plurality of errors comprises:
    generating a preprocessed log file by normalizing the plurality of log messages of the one or more configuration logs;
    generating a filtered log file by filtering the preprocessed log file, wherein the filtered log file comprises:
      one or more log messages associated with a service start;
        one or more log messages associated with a service shutdown; and
      one or more log messages associated with a service restart; and
    utilizing Latent Symantec Analysis on the filtered log file to determine the particular service running on the computing cluster that has generated the plurality of errors.

14. The system of claim 13, the processor further configured to:
retrieve configuration data from the computing cluster about the particular service running on the computing cluster, the configuration data comprising:
  a plurality of configuration keys; and
  a plurality of historical configuration values, wherein each historical configuration value is associated with one of the plurality of configuration keys; and
display a configuration change graphical user interface on an electronic display, the configuration change graphical user interface comprising the plurality of configuration keys and the plurality of historical configuration values.

15. The system of claim 13, wherein the computing cluster is a Hadoop computing clusters.

16. The system of claim 13, wherein normalizing the plurality of log messages comprises one or more of:
  lowercasing the plurality of log messages;
  removing special characters from the plurality of log messages;
  removing stop words from the plurality of log messages; and
  applying lemmatization.

17. The system of claim 13, the processor further configured to:
in response to determining that the particular error has not previously occurred, generate and send one or more other commands to the computing cluster, the one or more other commands operable to change the current configuration value for the particular service running on the computing cluster to a previous configuration value for the particular service running on the computing cluster.

\* \* \* \* \*